(12) United States Patent
Bowlsbey et al.

(10) Patent No.: US 9,374,878 B2
(45) Date of Patent: *Jun. 21, 2016

(54) SYSTEM AND METHOD FOR SERVICING X-RAY TUBES IN SITU

(71) Applicant: SOUTHERN LINAC, LLC, Mandeville, LA (US)

(72) Inventors: Clark Bowlsbey, Mandeville, LA (US); Edward Q. Castle, Jr., Covington, LA (US)

(73) Assignee: SOUTHERN LINAC, LLC, Mandeville, LA (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/827,834

(22) Filed: Mar. 14, 2013

(65) Prior Publication Data

US 2014/0270089 A1   Sep. 18, 2014

(51) Int. Cl.
*H05G 1/02* (2006.01)
*H01J 35/12* (2006.01)
(Continued)

(52) U.S. Cl.
CPC ............ *H05G 1/025* (2013.01); *F01P 11/0204* (2013.01); *F01P 11/028* (2013.01); *F01P11/0276* (2013.01); *H01J 7/24* (2013.01); *H01J 7/26* (2013.01); *F16K 51/02* (2013.01); *F25B 45/00* (2013.01); *F28F 27/00* (2013.01); *H01J 7/20* (2013.01); *H01J 35/12* (2013.01)

(58) Field of Classification Search
CPC .............. F17C 5/00; F17C 5/002; F17C 5/06; F17C 2205/03; F17C 2205/0302; F17C 2205/0323; F17C 2205/0326; F17C 2205/0335; F17C 2205/0338; F17C 2205/037; F17C 2205/0382; F17C 2205/0388; F17C 2205/0391; F17C 2205/0394; F17C 2205/0397; F17C 2227/00; F17C 2227/01; F17C 2227/0128; F17C 2227/0135; F17C 2227/0171; F17C 2227/0178; F17C 2227/0185; F17C 2227/0192; F17C 2227/03; F17C 2227/0337; F17C 2227/0355; F17C 2227/04; F17C 2224/045; F16K 15/00; F16K 51/00; F16K 51/02; F01P 11/00; F01P 11/0204; F01P 11/0276; F01P 11/028; F01P 2011/065; G05D 7/00; G05D 16/00; H05G 1/025; H01J 7/14; H01J 7/15; H01J 7/20; H01J 7/22; H01J 7/24; H01J 7/26; H01J 35/12; H01J 2235/12; H01J 2235/1204; H01J 2235/1208; H01J 2235/1216; H01J 2235/122; H01J 2235/1225; H01J 2235/1262; H01J 2235/1266; H01J 2235/127; H01J 2235/1287; F25B 45/00; F28F 27/00

USPC .................. 378/119, 123, 130, 141, 204, 210; 137/14, 15.01, 15.04, 340, 563, 137/565.05, 565.23, 571, 572, 590, 592, 137/861, 872; 165/95, 104.19, 104.27, 165/104.28, 104.32, 904

See application file for complete search history.

(56) References Cited

U.S. PATENT DOCUMENTS 2,681,657 A * 6/1954 Griffith, Jr. .................. 134/98.1
2,835,234 A * 5/1958 Rasch et al. ................ 123/41.42

(Continued)

*Primary Examiner* — Anastasia Midkiff
(74) *Attorney, Agent, or Firm* — Marshall, Gerstein & Borun LLP

(57) ABSTRACT

Systems and methods for replacing coolant of an x-ray tube assembly having a closed cooling system include a service port that is operatively installed in the cooling system and a vacuum assisted service kit that is operatively coupled to the service port. Used coolant is drained from the x-ray tube assembly, and thereafter a vacuum is drawn on the x-ray tube assembly via the service kit. Replacement coolant within a vacuum tank of the service kit is degassed under a vacuum. The degassed replacement coolant is provided into the cooling system from the vacuum tank, preferably by pushing under pressure with an inert gas to prevent the introduction of any air into the replacement coolant. The replacement coolant may be pressurized in the cooling system with the inert gas. Thereafter, the service port is closed, and the service kit may be disconnected from the service port.

23 Claims, 3 Drawing Sheets

(51) Int. Cl.
*H01J 7/24* (2006.01)
*F01P 11/02* (2006.01)
*F16K 51/02* (2006.01)
*F25B 45/00* (2006.01)
*F28F 27/00* (2006.01)
*H01J 7/26* (2006.01)
*H01J 7/20* (2006.01)

(56) References Cited

U.S. PATENT DOCUMENTS

| | | | |
|---|---|---|---|
| 3,108,633 A * | 10/1963 | Walton | 165/51 |
| 4,805,416 A * | 2/1989 | Manz et al. | 62/292 |
| 5,101,641 A * | 4/1992 | Van Steenburgh, Jr. | 62/292 |
| 5,168,720 A * | 12/1992 | Keltner | 62/292 |
| 5,273,085 A | 12/1993 | Edwards et al. | |
| 5,440,608 A | 8/1995 | Peralta et al. | |
| 5,586,583 A | 12/1996 | Edwards et al. | |
| 5,596,622 A | 1/1997 | Peralta et al. | |
| 5,732,123 A | 3/1998 | Peralta et al. | |
| 6,073,666 A | 6/2000 | Clark, II | |
| 6,082,414 A * | 7/2000 | Wu et al. | 141/8 |
| 6,254,272 B1 | 7/2001 | Dilick | |
| 7,001,070 B2 | 2/2006 | Kendall et al. | |
| 7,111,650 B2 | 9/2006 | Few | |
| 2001/0017908 A1 | 8/2001 | Dilick | |
| 2010/0213083 A1* | 8/2010 | Olander et al. | 206/7 |

* cited by examiner

SYSTEM AND METHOD FOR SERVICING X-RAY TUBES IN SITU

FIELD OF THE INVENTION

The present disclosure relates to a system and method for changing coolant in an x-ray tube system.

BACKGROUND

Linear accelerators can be used for radiation treatment in the medical field and can include targeting systems using x-ray machines, for example. Linear accelerators have a limited life span and are expensive. For example, an x-ray tube in a linear accelerator may have a warranty usage of some predetermined number of uses. Thereafter, the owner of the machine usually needs to either replace the x-ray tube or service the x-ray tube to extend the useful lifespan of the machine. Frequently, the cost to service the machine is significantly less than the cost of replacing an x-ray tube or an entire linear accelerator. Therefore, it is desirable to have systems and methods of servicing and maintaining a linear accelerator that be used as an alternative to replacing a linear accelerator.

FIG. 1 is a diagrammatic illustration of an exemplary radiation generating machine 10. The machine 10 includes a base support 12, a moveable gantry 14, and a linear accelerator 16 carried within the gantry 14. The linear accelerator 16 includes an x-ray tube 18, which may be carried in an arm of the gantry 14, and a cooling system 20 for cooling the x-ray tube 18 during use. The cooling system 20 includes a heat exchanger 22, coolant circulation conduits 24 that connect the heat exchanger 22 to the x-ray tube 18, and usually additional equipment, such as pumps, valves, and/or switches to control the flow and circulation of coolant between the heat exchanger 22 and the x-ray tube 18.

The x-ray tube 18 generates significant amounts of heat during its use. The generated heat, however, can damage the working parts of the x-ray tube 18. Therefore, the cooling system 20 is used to cool the x-ray tube 18 and thereby prevent premature failure of the working parts of the x-ray tube 18.

The cooling system 20 operates by circulating a coolant, usually oil, such as Shell Diala AX, through the x-ray tube 18 and to the heat exchanger 22. The heat exchanger 22 cools the coolant and then the coolant is returned to the x-ray tube 18 through the circulation conduits 24, where the cooling process is repeated. However, the coolant breaks down over time due to the heat generated by the x-ray tube, which diminishes the ability of the coolant to function at its optimal performance levels. When this happens, either the entire x-ray tube 18 must be replaced or the old coolant can be replaced with new coolant.

As indicated above, it is generally significantly less expensive to replace the coolant rather than buying an entirely new x-ray tube 18. However, there are some limitations that must be met. One significant limitation is that the coolant should not have any air entrapped therein. Entrapped air in the coolant can degrade the coolant in the x-ray tube 18. Therefore, in replacing the coolant, it is important to minimize or eliminate any entrained air in the coolant. To this end, the cooling system 20 of the linear accelerator 16 is a closed system, which is sealed to prevent air from entering into the cooling system and the coolant.

SUMMARY

According to some aspects of the present disclosure, systems and methods are disclosed that allow coolant from a linear accelerator to be replaced under vacuum to ensure that air and other unwanted gasses are removed from the replacement coolant and from the cooling system when the replacement coolant is placed into the cooling system.

In some exemplary arrangements, a coolant replacement system for a linear accelerator includes a service port operatively connected to a coolant conduit of the linear accelerator, a vacuum tank operatively connected to the service port, a vacuum pump operatively connected to the vacuum tank, and an inert gas supply operatively connected to the vacuum tank. The inert gas supply is preferably operatively connected to the vacuum tank by way of a bladder, wherein the bladder is operatively connected to the vacuum tank, and the inert gas supply is operatively connected to the bladder. One or more flow control valves arranged to allow the vacuum pump to draw a vacuum in the vacuum tank and the coolant conduit to degass the coolant conduit and replacement coolant in the vacuum tank. One or more flow control valves arranged to allow the inert gas supply to push degassed coolant into the evacuated coolant conduit.

In other exemplary arrangements, a method of replacing coolant in a closed cooling system of a linear accelerator is disclosed. The cooling system is opened, and used coolant is removed from the opened cooling system. Thereafter, the cooling system is closed and a vacuum tank is operatively connected to the cooling system. Air is evacuated from the cooling system by drawing a vacuum in the cooling system. Replacement coolant in the vacuum tank is degassed by drawing a vacuum in the vacuum tank. The degassed replacement coolant is pushed from the vacuum tank into the evacuated cooling system with an inert gas. Thereafter, the cooling system is re-closed with the degassed replacement cooling coolant disposed in the cooling system without allowing air to enter into the cooling system.

In yet other exemplary arrangements, a service kit for replacing used coolant in a cooling system of a linear accelerator having a selectively reclosable service port installed to allow vacuum access to the cooling system is disclosed. The service kit includes a vacuum tank, a recouplable vacuum connector for operatively coupling and decoupling the vacuum tank with the service port, a vacuum pump operatively coupled to the vacuum tank, a bladder operatively coupled to the vacuum tank, a supply of inert gas operatively coupled to the bladder, and a plurality of flow control valves arranged to selectively isolate the vacuum tank from any one or more of the supply of inert gas, the vacuum pump, and the service port. The vacuum pump is arranged to draw a vacuum from the vacuum tank.

In further exemplary arrangements, a linear accelerator includes an x-ray tube, a heat exchanger, a circulation conduit for transferring coolant between the heat exchanger and the x-ray tube, a coupling disposed along the circulation conduit, a recouplable vacuum connector operatively connected to the coupling, and a flow control valve arranged to selectively isolate the coupling from the recouplable vacuum connector.

In further accordance with any one or more of the foregoing aspects and exemplary arrangements, a coolant replacement system, a method, a service kit, a linear accelerator, and/or components thereof according to the teachings of the present disclosure optionally may include any one or more of the following optional forms.

In some optional forms, the service port includes a vacuum coupling operatively coupled to the coolant conduit and a shutoff valve operatively disposed between the vacuum coupling and the coolant conduit to open and/or close flow of fluid between the vacuum coupling and the coolant conduit.

In some optional forms, the vacuum tank includes a tank with an opening and a resealable lid removably covering the opening. The vacuum tank may include an exhaust port operatively connecting the vacuum pump to the vacuum tank, a feed port operatively connecting the vacuum tank to the bladder, and/or a dip tube operatively connecting the vacuum tank to the service port. The dip tube may have an inlet dispose below the exhaust port and the feed port.

In some optional forms, a one or more valves are operatively arranged to selectively isolate various components of the system. A first flow control valve may be operatively disposed between the feed port and the bladder. A second flow control valve may be operatively disposed between the exhaust port and the vacuum pump. A third flow control valve may operatively disposed between the inlet of the dip tube and vacuum connector. A fourth flow control valve may be operatively disposed between the third flow control valve and the vacuum connector. One or more of the valves may be shutoff valve or a check valve In some optional forms, the vacuum connector includes a quick disconnect plug and a quick disconnect coupler arranged to selective couple and decouple with each other in a manner arranged to maintain a vacuum present in the conduits.

In some optional forms, the bladder may include one or more of a flexible walled container, a bellows, and an expansion tank.

In some optional forms, the inert gas supply includes a tank containing inert gas. A sixth flow control valve may be operatively disposed between the bladder and the tank. A pressure regulator may be operatively disposed between the bladder and the tank. The inert gas may be, for example, nitrogen.

In some optional forms, the evacuated cooling system is operatively isolated from the vacuum tank before degassing the replacement coolant, for example by closing a flow control valve. The evacuated cooling system may be operatively reconnected in a vacuum sealed manner to the vacuum tank before pushing the degassed replacement coolant from the vacuum tank into the evacuated cooling system, for example, by opening the flow control valve.

In some optional forms, a vacuum is drawn from the air bladder operatively connected to the vacuum tank to contract the bladder, preferably while degassing the replacement coolant.

In some optional forms, the replacement coolant is pushed into the cooling system by providing inert gas to the vacuum tank through the bladder through, preferably while the bladder is contracted. A positive pressure may be provided to the inert gas sufficient to re-expand the bladder after the degassed replacement fluid is pushed into the evacuated cooling system, for example, by expanding the bladder to approximately 25 percent capacity.

In some optional forms, a fifth flow control valve is operatively disposed between the bladder and the supply of inert gas and arranged to selectively isolate the bladder from the supply of inert gas.

In some optional forms, the coupling is in the form of a t-coupling having a first branch connected to a first portion of the circulation conduit, a second branch connected to a second portion of the circulation conduit, and a third branch connected to a connection conduit extending to the recouplable vacuum connector. The flow control valve of the service port may be a shutoff valve disposed along the connection conduit Other viable aspects and optional forms of the system, method, kit, and linear accelerator disclosed herein will be apparent upon consideration of the following detailed description and the appended drawings.

DETAILED DESCRIPTION

Figure 1:
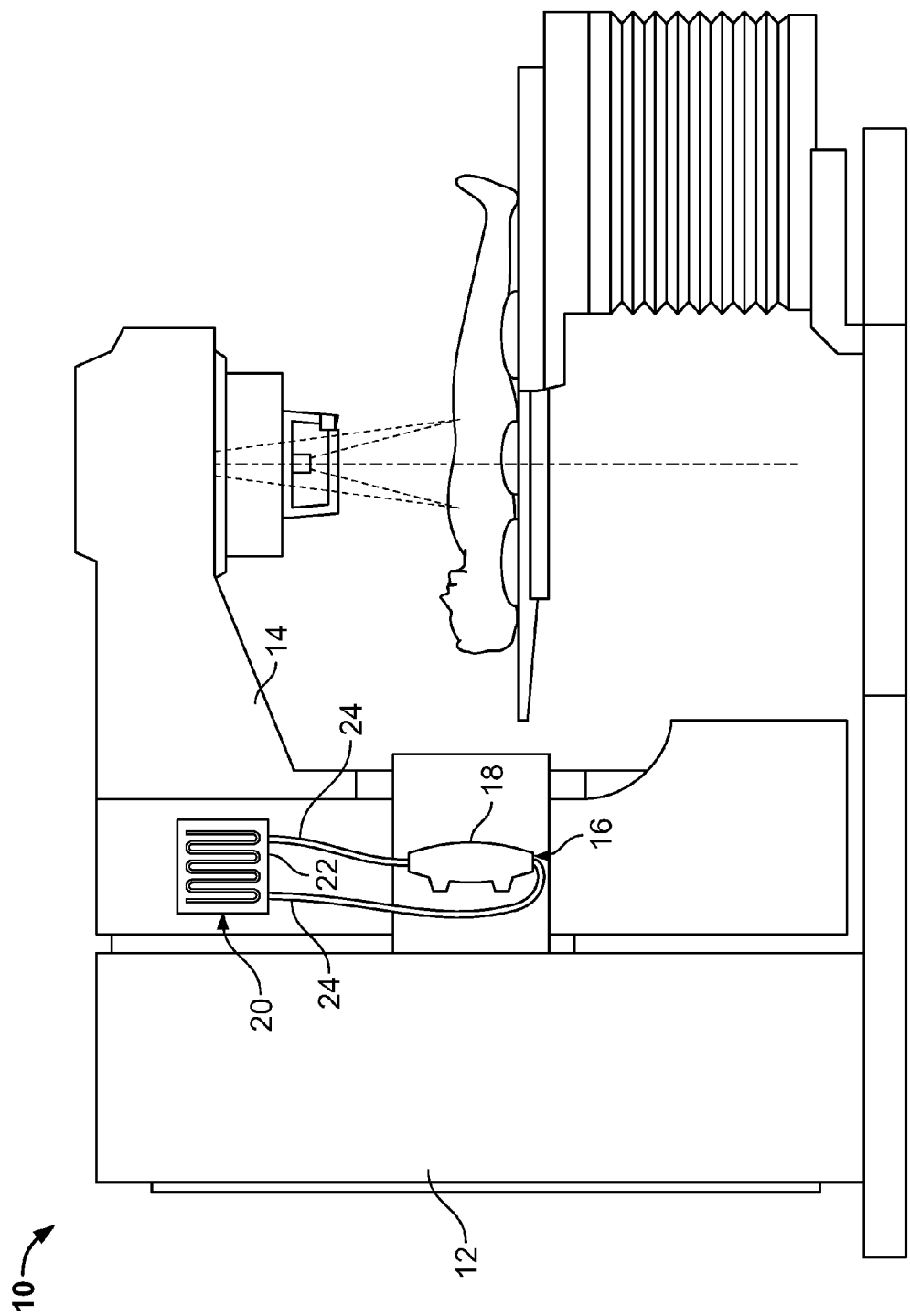
FIG. 1 is a schematic side elevational view of a radiation generating machine including a linear accelerator according to the prior art.
Figure 2:
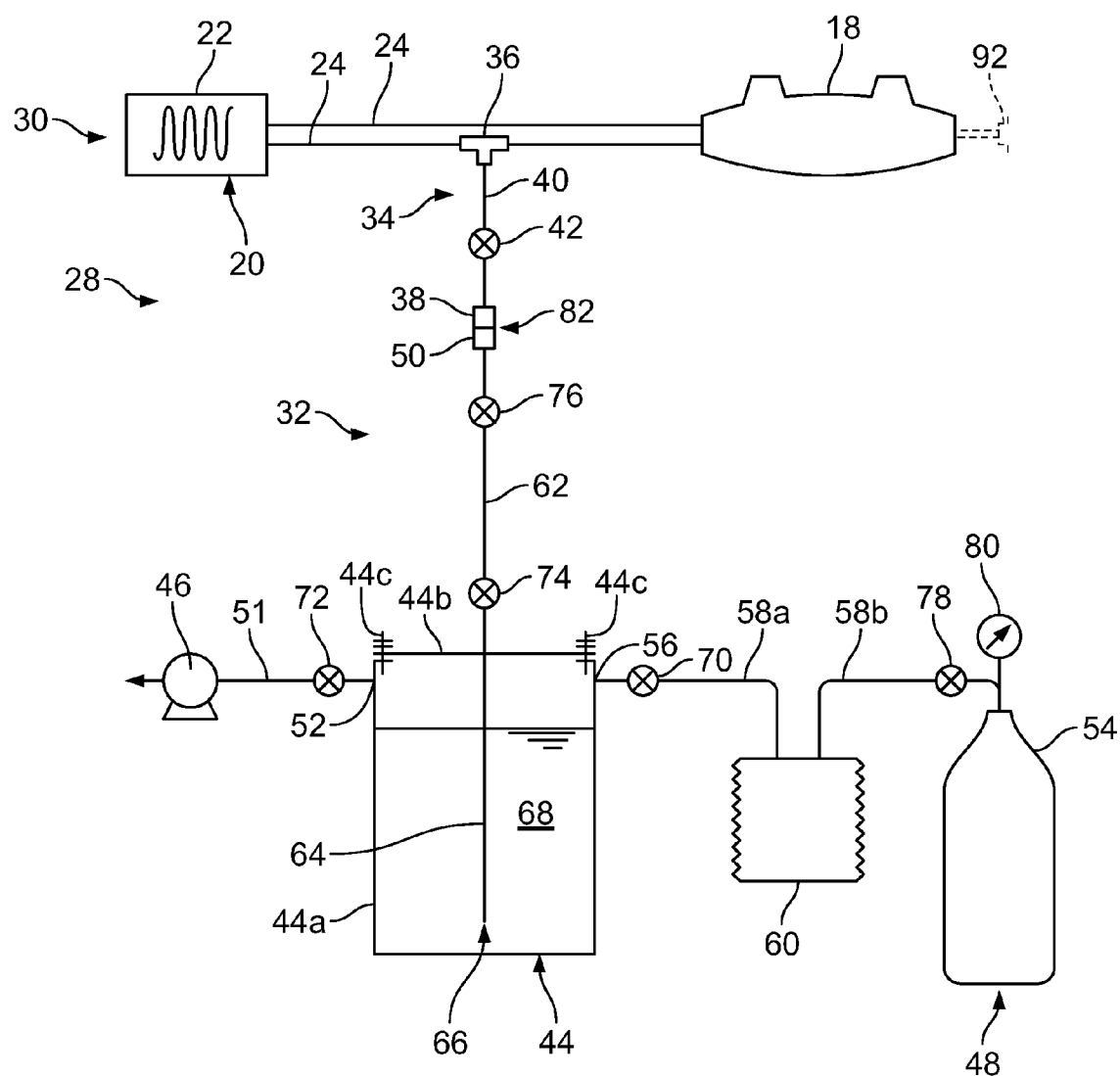
FIG. 2 is a schematic illustration of an x-ray tube system and a coolant replacement system including a service port and a service kit according to the teachings of the present disclosure.

Turning now to the drawings, FIG. 2 illustrates a coolant replacement system 28 for an x-ray tube system 30 and a service kit 32 for replacing the coolant in the x-ray tube system 30 according to a first technical example of the present disclosure. The x-ray tube system 30 includes an x-ray tube 18 and a cooling system 20, including a heat exchanger 22 and coolant circulation conduits 24. In addition, the x-ray tube system 30 is provided with a service port 34, which is preferably permanently installed along one of the coolant circulation conduits 24, for example, between the heat exchanger 22 and the x-ray tube 18. The service kit 32 may be coupled and decoupled to the service port 34 to allow a vacuum to be drawn from the coolant circulation conduits 24, and thereby from the cooling system 20 and the x-ray tube 18, through the service kit 32, and to allow replacement coolant, such as oil, to be transferred into the coolant circulation conduits 24 from the service kit 32 without allowing any substantial amount of air to enter into the coolant circulation conduits 24. In this arrangement, the coolant replacement system 28 provides an effective way to replace used coolant in the x-ray tube system 30 with replacement or new coolant in a way that more reliably ensures that the replacement coolant and the entire coolant circulation system of the x-ray tube system 30 is free of unwanted air.

The service port 34 is preferably permanently installed on the x-ray tube system 30 to provide fluid access to the coolant circulation conduits 24 for drawing a vacuum from the cooling system 20 and the x-ray tube 18 and providing new replacement coolant into the circulation conduits. The service port 34 includes a coupling that is operatively disposed along the cooling system 20 to maintain a vacuum therein. The coupling 36 may be a T-coupling disposed along one of the coolant circulation conduits 24 and sealed to maintain a vacuum or any other coupling capable of providing similar fluid access into and out of the coolant circulation conduits. The service port 34 further includes a recouplable vacuum connector 38 operatively connected to the coupling 36, such as with or along a stub conduit 40, and a service flow control valve 42, such as a shut off valve, operatively disposed along the stub conduit 40 between the vacuum coupling 36 and the recouplable vacuum connector 38. The flow control valve 42 can be selectively opened and/or closed so as to selectively isolate the recouplable vacuum connector 38 from the coupling 36 to either provide fluid access into and out of the coolant circulation conduits 24 and/or to close the cooling system 20.

The service kit 32 can include, at least in part, a vacuum tank 44, a vacuum pump 46, a supply of inert gas 48, and another recouplable vacuum connector 50 for operatively coupling and decoupling with the recouplable vacuum connector 38 of the service port 34. The vacuum pump 46 is operatively connected to the vacuum tank 44, for example, with a conduit 51 connected to an exhaust port 52 of the vacuum tank 44, such that the vacuum pump 46 can evacuate air and thereby draw a vacuum in the vacuum tank 44. The supply of inert gas 48 is carried within a tank 54 that is operatively connected to a feed port 56 of the vacuum tank 44 by one or more conduits 58a and 58b. A bladder 60 is operatively disposed along the conduits 58a and 58b to provide a collapsible and expandable container or diaphragm operatively disposed between the supply of inert gas 48 and the vacuum tank 44. A conduit 62 operatively connects the recouplable vacuum connector 50 to the vacuum tank 44 so as to provide fluid communication between the recouplable vacuum connector 50 and the interior of the vacuum tank 44.

The vacuum tank 44 includes a container body 44a defining an interior area and a top opening into the interior, and a lid 44b for sealingly closing the top opening. One or more locks 44c, such as nuts, wing nuts, clamps, or other known locking devices, are used to releasably seal and lock the lid 44b onto the container body 44a covering the opening. A dip tube 64 extends into the interior of the vacuum tank 44 and has an inlet 66 disposed near the bottom of the interior of the container body 44a. The dip tube 64 is carried, for example, by the lid 44b and operatively connects to the conduit 62. Each of the exhaust port 52 and the feed port 56 is disposed near a top portion of the vacuum tank 44, such as along the top of the container body 44a near the open top, such that, when the vacuum tank is 44 is in an upright position, the inlet 66 of the dip tube 64 is disposed at or near a lowest point of the vacuum tank 44 and the exhaust port 52 and the feed port 56 are disposed above the inlet 66. In this manner, replacement coolant 68 disposed in the interior of the vacuum tank 44 covers the inlet 66 of the dip tube 64 and has a top surface disposed below the exhaust port 52 and feed port 56, as will be described in more detail below.

In addition to the foregoing, the service kit 32 can also include a number of flow control valves that are operatively arranged to allow various components of the service kit 32 and the service port 34 to be selectively operatively connected and isolated, i.e., placed in fluid connection or isolation, from other components and to control flow of fluid through the coolant replacement system 28. For example, a first flow control valve 70 is operatively disposed along the conduit 58a between the feed port 56 and the bladder 60 to allow the vacuum tank 44 to be selectively isolated from the bladder 60. The first flow control valve 70 may be, for example, an on/off valve, such as a globe valve, a disc valve, a butterfly valve, or other type of on/off valve. A second flow control valve 72 is operatively disposed between the vacuum tank 44 and the vacuum pump 46, such as along the conduit 51, to allow the vacuum tank 44 to be selectively isolated from the vacuum pump 46. The second flow control valve 72 may be an on/off valve or a one way check valve. A third flow control valve 74 is operatively disposed between the recouplable vacuum connector 50 and the vacuum tank 44 along the conduit 62. And, a fourth flow control valve 76 is operatively disposed between the third flow control valve 74 and the recouplable vacuum connector 50 along the conduit 62. Each of the third and fourth flow control valves 74 and 76 is operable to isolate the recouplable vacuum connector 50 from the vacuum tank 44, and may be on/off valves. A fifth flow control valve 78 is operatively disposed between the bladder 60 and the tank 54 along the conduit 58b to allow the inert gas supply 48 to be selectively isolated from the bladder 60 and the vacuum tank 44. The fifth flow control valve 78 may be an on/off valve, such as a globe valve or butterfly valve or other type of valve that may be selectively turned on and/or off to allow for stop fluid flow therethrough. Each of the first through fifth flow control valves 70, 72, 74, 76, and 78 is operable independently of the other flow control valves. A pressure regulator 80 can be connected to the tank 54 to regulate the pressure of inert gas flowing from the tank 54 to the bladder 60 and the vacuum tank 44, preferably at a pre-selected or selectable pressure, in a manner well understood in the art.

The recouplable vacuum connectors 38 and 50 together form a vacuum connector 82 between the service port 34 and the service kit 32 that can be coupled and decoupled in a manner to preserve a vacuum and/or positive pressure within the vacuum tank 44 and/or the coolant circulation conduits 24 of the cooling system 20 of the x-ray tube system 30. Many vacuum connectors are known and would be suitable for use as the vacuum connector 82. In one example, the recouplable vacuum connector 38 may be a quick disconnect plug and the recouplable vacuum connector 50 may be a complimentary quick disconnect coupler known in the art. While the service port 34 has not been expressly described as being part of the service kit 32, in other versions, the service kit 32 can include the service port 34 as well.

The vacuum pump 46 may be any type of pump suitable for drawing a vacuum from the vacuum tank 44 preferably, the vacuum pump is sufficient to draw a vacuum, for example, 20, 30, 40, or more inches of mercury. However, the vacuum pump 46 may be sized and selected in any manner necessary and sufficient to draw a desired vacuum from the vacuum tank 44 and from the coolant circulation conduits 24 as explained in additional detail hereinafter.

The bladder 60 may take any of various forms of a container that is both collapsible and then re-expandable. For example, the bladder 60 may include a bellows, a flexible walled plastic jug or bag, a hard-walled container with one or more moveable walls that allow the container to effectively expand and/or collapse, or any of other various known or similar expandable and contractible containers. In some versions, the bladder 60 can include what is conventionally referred to as a "let-up kit," for example.

Each of the conduits 24, 40, 62, 51, 58a, and 58b, may be made of any suitable material and be in the form of for example rubber hoses, braided hoses, multi-walled hoses, metal hoses, metal tubes, or any other conduit suitable for transporting fluids in a closed pressurized system.

With the service kit 32 and related components configured as described, a detailed exemplary technical method of using the cooling replacement system 28 to replace the coolant in the cooling system 20 of the x-ray tube system 30 is described with reference to FIG. 2. Before changing the coolant in the x-ray tube system 30, it is of course preferably to stop operation the x-ray tube system 30, including turning off the x-ray tube 18 and turning off any circulation pumps and/or other components of the radiation generating device 10.

Figure 3:
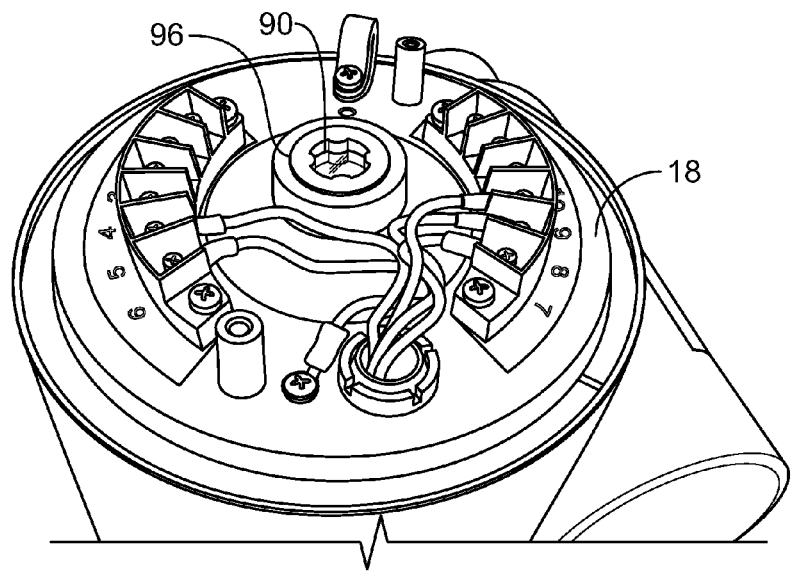
FIG. 3 is a partial isometric view of an x-ray tube showing a site glass disposed in a drain opening.
Figure 4:
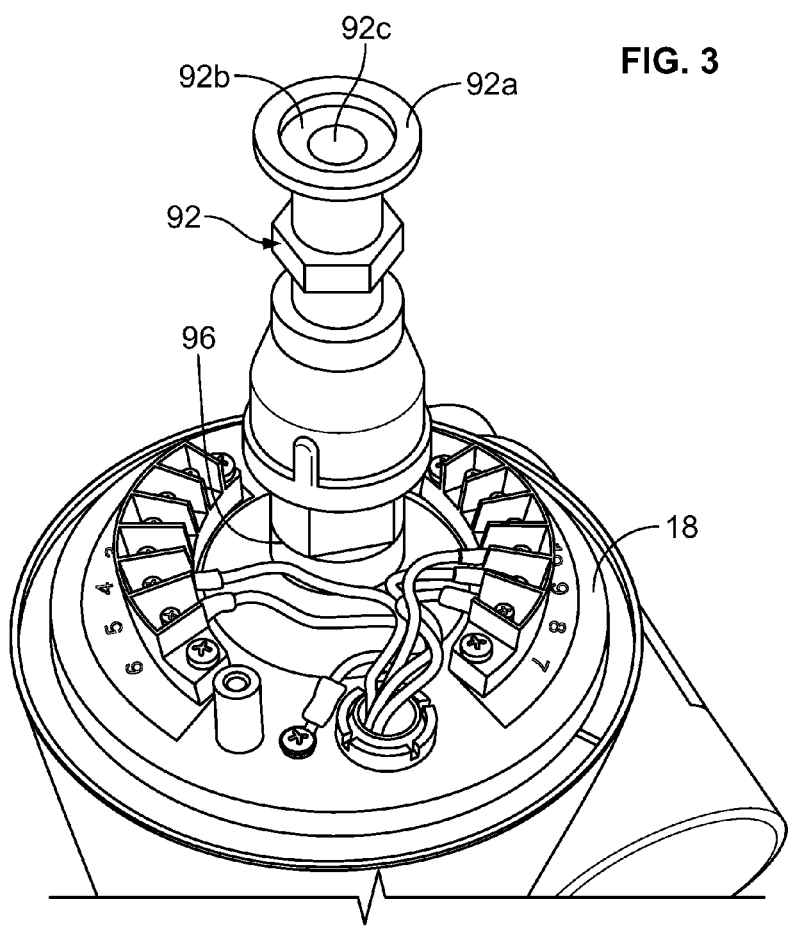
FIG. 4 is a partial isometric view of the x-ray tube similar to FIG. 3 but with a nozzle disposed in the drain opening.

Next, used coolant is removed from the x-ray tube 18 and the cooling system 20. This can be accomplished in situ, that is, with the x-ray tube system 30 remaining in its operative position in the housing of its support structure, such as the gantry 14, or by removing the x-ray tube system 30, either partially or completely, from its support structure. With reference to FIGS. 3 and 4, one preferred way to remove the coolant is to remove, e.g., unscrew, a sight glass 90 from a drain opening 96 located on the x-ray tube 18 to open or unseal the coolant circulation system of the x-ray tube system 30. Thereafter, a nozzle 92 as shown in FIG. 4 is fitted into, e.g., screwed into, the drain opening 96. The nozzle 92 is arranged to allow the coolant to be poured out of the x-ray tube 18 without dripping onto the exterior of the x-ray tube 18. Thereby, the used coolant can be drained from the cooling system 20 in a way that keeps the x-ray tube 18 clean. The nozzle 92 has an end flange 92a defining an annular recess 92b surrounding the opening 92c of the nozzle 92. The nozzle 92 includes a male connector (not shown) at an opposite end from the end of flange 92a with external threads for threaded connection to the drain opening 96. With the nozzle 92 attached to the drain opening 96, the used coolant may be removed from the x-ray tube system 30 either in situ, as carried in the gantry 14, or the x-ray tube system 30 may be completely removed from the gantry 14 for the removal and replacement of the coolant. If the coolant is replaced in situ, a hose, for example, may be connected to the end flange 92a to carry the used coolant to a receptacle without getting used coolant all over the support structure, such as the gantry 14.

After the coolant has been drained from the x-ray tube 18, the nozzle 92 is removed from the drain opening 96 and the sight glass 90 is re-installed to seal the drain opening 96.

After the cooling system 20 has been drained and resealed, the service port 34 is installed. Of course, if the service port 34 is already installed, the following installation steps may be skipped at this point. To install the service port 34, one of the coolant circulation conduits 24 is severed, and a first portion of the conduit 24 is connected to a first branch of the coupling 36, which in this case is a t-coupling, and a second portion of the conduit 24 is connected to a second branch of the t-coupling. The stub conduit 40 is attached to the third branch of the t-coupling, and the valve 42 and recouplable vacuum connector 38 are either already installed or are thereafter installed operatively connected to the t-coupling 36.

Next, the service kit 32 is operatively coupled to the service port 34 by connecting the recouplable vacuum connector 50 to the recouplable vacuum connector 38. In this manner the vacuum tank 44 is operatively connected with the cooling system 20 via the service port 34 to allow fluid to be transferred under pressure and/or vacuum between the coolant circulation conduits 24 and the interior of the vacuum tank 44.

The vacuum pump 46 is operatively coupled to the vacuum tank 44 at the exhaust port 52.

Next, the cooling system 20 is evacuated by drawing a vacuum through the vacuum tank 44 and the service port 34 with the vacuum pump 46. To do this, the service flow control valve 42 and the second, third, and fourth flow control valves 72, 74, 76 are opened. The first flow control valve 70 at this point is preferably closed. The vacuum pump 46 is turned on and draws a vacuum on of the vacuum tank 44 and the cooling system 20, preferably up to approximately thirty inches of mercury, although other vacuum pressures may also or alternatively be used depending on various parameters of the various components. In some cases, it is estimated that the vacuum pump 46 may need to be activated for approximately fifteen minutes to ensure that a sufficient vacuum has been drawn in the coolant circulation conduits 24, the heat exchanger 22, and the x-ray tube 18. Of course, this depends upon the size and performance capabilities of the vacuum pump 46.

Next, the cooling system 20 is isolated from the vacuum tank 44, for example, by closing the service flow control valve 42 in the service port 34.

After the evacuated cooling system 20 has been isolated from the vacuum tank 44, an amount of coolant sufficient to fill the cooling system 20 as appropriate is added into the vacuum tank 44. This may be accomplished, for example, by unlocking the locks 44c, opening the lid 44b, pouring replacement coolant 68 into the interior of the container body 44a, and then resealing the lid 44b onto the tank 44 with the locks 44c.

Next, if the bladder and inert gas supply 48 have not already been connected to the vacuum tank 44, with the flow control valve 70 closed, the bladder 60 is operatively connected to the vacuum tank 44 by attaching the conduit 58a to the bladder 60. The bladder 60 is also operatively connected to the inert gas supply 48 by connecting the conduit 58b to the tank 54. In this manner the inert gas supply 48 is operatively connected to the vacuum tank 44 via the bladder 60.

With the third flow control valve 74 closed, thereby isolating the vacuum tank 44 from the vacuum connector 82, the vacuum pump 46 is activated with the second flow control valve 72 opened to draw a vacuum, preferably of approximately thirty inches of mercury, inside the vacuum tank 44. A vacuum is also drawn from the bladder 60, thereby collapsing the bladder 60. The vacuum may be held for any necessary period of time to ensure that all air is removed from the replacement coolant 68 that resides in the tank 44. In this way, the replacement coolant 68 is degassed and all air is substantially eliminated from the replacement coolant 68.

With the vacuum pump 46 still drawing a vacuum from the vacuum tank 44, the second flow control valve 74 (and the third and service flow control valves 76 and 42, respectively, if necessary) is opened, thereby operatively reconnecting the vacuum tank 44 to the coolant circulation conduits 24. The vacuum pump 46 remains running to ensure that a desired and balanced vacuum pressure, e.g., approximately thirty inches of mercury, is drawn across both the vacuum tank 44 and the cooling system 20 of the x-ray tube system 30. The amount of time that this takes varies of course upon the operating characteristics of the vacuum pump 46. After the desired vacuum pressure is attained across the vacuum tank 44 and the coolant circulation conduits 24, the second flow control valve 72 is closed and the vacuum pump 46 may be shut off. Thus at this point the vacuum tank 44, the conduits 62 and 40, and the coolant circulation conduits 24 and other portions of the cooling system 20 of the x-ray tube system 30 are under a single vacuum pressure in a substantially sealed or closed system.

Next, the bladder 60 is filled with inert gas, such as nitrogen, from the inert gas supply 48. To do this, the first flow control valve 70 is closed after the vacuum has been drawn on the bladder 60. Then, the fifth flow control valve 78 is opened, and pressurized gas inside the tank 54 transfers into the bladder 60 until a predefined pressure set by the regulator 80 is achieved. This expands the bladder 60. The flow control valve 78 is subsequently closed after the bladder 60 has been filled with the inert gas.

Next, the replacement coolant 68 that resides in the tank 44 under pressure is forced from the tank 44 into the evacuated cooling system 20 with the inert gas. To do this, the first flow control valve 70 is opened, preferably slowly so as to minimize any sudden pressure surges. Atmospheric pressure on the bladder 60 pushes the inert gas into the upper portion of the vacuum tank 44 via the feed port 56 and thereby forces the replacement coolant 68 up into the inlet 66 of the dip tube 64 and from there into the coolant circulation conduits 24, which were previously under a vacuum, via the conduits 62 and 40. After the pressure in the vacuum tank 44 and the remaining portions of the cooling system 20 reach atmospheric pressure due to compression of the bladder 60, the fifth flow control valve 78 may be slowly opened to allow inert gas from the tank 54 under positive pressure to provide additional positive pressure into the vacuum tank 44 and thus also the cooling system 20 of the x-ray tube system 30, thereby pressurizing the replacement coolant 68 in the coolant circulation conduits 24. Although the replacement coolant 68 may be positively pressurized to any desired pressure, in one preferred method, the inert gas supply 48 is left operatively connected to the vacuum tank 44 by having the first and fifth flow control valves 70 and 78 opened until the bladder 60 expands to approximately a 25% full or expanded condition. After the replacement coolant 68 has been pushed into the coolant circulation conduits 24 by the inert gas and achieved the desired pressure, the service flow control valve 42 and the third and fourth flow control valves 74 and 76 are closed, and thereafter the first flow control valve 70, and optionally the fifth flow control valve 78 are also closed. In this condition, the service port 34 and thus the cooling system 20 of the x-ray tube system 30 is isolated from the vacuum tank 44 and pressurized, and preferably the vacuum tank 44 is also isolated from the inert gas supply 48.

At this point, it is preferable to verify that there is no air in the cooling system 20. This may be accomplished, for example, by rotating the gantry 14 or the x-ray tube 18 and visually observing whether any air bubbles are visible in the sight glass 90 of the x-ray tube 18. Other suitable methods of checking for the presence of air in the cooling system 20 are also equally acceptable.

Next, if no air has been identified in the cooling system 20, the flow control valve 42 is closed, and the service kit 32 may be disconnected from the service port 34 by uncoupling the recouplable vacuum connector 50 from the recouplable vacuum connector 38. If air bubbles are identified through the sight glass 90, the sight glass 90 can be slightly loosened such that the pressurized bubbles naturally expel to atmosphere.

Based on the foregoing, it should be appreciated that the system and method of replacing coolant in a closed cooling system of an x-ray tube system and various components thereof according the teachings of the present disclosure are useful for doing so in a manner that ensures that the replacement coolant will be free of any unwanted air. The system and method of the present disclosure also provide a cost effective alternative to currently known methods of replacing a coolant in an x-ray tube system and/or simply replacing the x-ray tube system when its maximum usage capacity has been reached due to degradation of the used coolant.

We claim:

1. A coolant replacement system, comprising
   a service port adapted to be operatively connected to a coolant conduit of a closed x-ray tube system;
   a vacuum tank operatively connected to the service port to supply replacement coolant to the coolant conduit;
   a vacuum pump operatively connected to the vacuum tank to selectively draw a vacuum on the vacuum tank;
   an inert gas supply operatively connected to the vacuum tank;
   one or more flow control valves disposed between the vacuum pump and the vacuum tank and arranged to allow the vacuum pump to be selectively isolated from or fluidly connected to the vacuum tank, whereby the vacuum pump can draw a vacuum on the vacuum tank and the coolant conduit; and
   one or more flow control valves disposed between the inert gas supply and the vacuum tank and arranged to allow the inert gas supply to be selectively isolated from or fluidly connected to the vacuum tank, whereby the inert gas supply can push coolant from the vacuum tank and into the evacuated coolant conduit.

2. The coolant replacement system of claim 1, wherein the service port comprises:
   a vacuum coupling operatively coupled to the coolant conduit; and
   a shutoff valve operatively disposed between the vacuum coupling and the coolant conduit to open and close flow of fluid between the vacuum coupling and the coolant conduit.

3. The coolant replacement system of claim 1, wherein the vacuum tank comprises:
   a tank with an opening; and
   a resealable lid removably covering the opening.

4. The coolant replacement system of claim 1, further comprising:
   a bladder operatively connected between the vacuum tank and the inert gas supply.

5. The coolant replacement system of claim 4, wherein the vacuum tank further comprises:
   an exhaust port operatively connecting the vacuum pump to the vacuum tank;
   a feed port operatively connecting the vacuum tank to the bladder; and
   a dip tube operatively connecting an interior of the vacuum tank to the service port, the dip tube having an inlet disposed below the exhaust port and the feed port.

6. The coolant replacement system of claim 5, further comprising:
   a first flow control valve operatively disposed between the feed port and the bladder;
   a second flow control valve operatively disposed between the exhaust port and the vacuum pump;
   a third flow control valve operatively disposed between the inlet of the dip tube and a vacuum connector; and
   a fourth flow control valve operatively disposed between the third flow control valve and the vacuum connector.

7. The coolant replacement system of claim 6, wherein each of the first, second, third, and fourth flow control valves comprises a shutoff valve or a check valve.

8. The coolant replacement system of claim 4, wherein the bladder comprises at least one of a flexible walled container, a bellows, and an expansion tank.

9. The coolant replacement system of claim 4, wherein the inert gas supply comprises:
   a tank containing an inert gas;
   a fifth flow control valve operatively disposed between the bladder and the tank; and
   a pressure regulator operatively disposed between the bladder and the tank.

10. The coolant replacement system of claim 1, further comprising a vacuum connector disposed between the service port and the vacuum tank, the vacuum connector comprising a quick disconnect plug and a quick disconnect coupler.

11. A method of replacing a coolant in a closed cooling system, the method comprising:
    opening the cooling system;
    removing used coolant from the opened cooling system;
    closing the cooling system after removing the used coolant;
    connecting a vacuum tank to the cooling system;
    evacuating air from the cooling system by drawing a vacuum on the vacuum tank and the cooling system;
    at least partially filling the vacuum tank with a quantity of replacement coolant;
    drawing a vacuum on the replacement coolant in the vacuum tank;

pushing the replacement coolant out from the vacuum tank and into the evacuated cooling system with an inert gas; and re-closing the cooling system after the replacement coolant is pushed therein without allowing air to enter the cooling system.

12. The method of claim 11, further comprising:

operatively isolating the cooling system from the vacuum tank before drawing a vacuum on the replacement coolant;

operatively reconnecting the cooling system to the vacuum tank before pushing the replacement coolant out from the vacuum tank and into the evacuated cooling system.

13. The method of claim 12, wherein operatively isolating the cooling system from the vacuum tank comprises closing at least one flow control valve disposed between the cooling system and the vacuum tank.

14. The method of claim 12, wherein operatively reconnecting the cooling system to the vacuum tank comprises opening at least one flow control valve.

15. The method of claim 11, wherein drawing a vacuum on the replacement coolant further comprises drawing a vacuum on an air bladder operatively connected to the vacuum tank, thereby contracting the air bladder.

16. The method of claim 11, wherein drawing a vacuum on the replacement coolant comprises degassing the replacement coolant.

17. The method of claim 15, further comprising filling the air bladder at least partly with the inert gas after drawing the vacuum on the replacement coolant.

18. The method of claim 17, wherein pushing the replacement coolant out from the vacuum tank comprises providing the inert gas to the vacuum tank through the bladder.

19. A service kit for replacing used coolant in a cooling system of an x-ray tube system having a selectively reclosable service port, the service kit comprising:

a vacuum tank;

a first recouplable vacuum connector for operatively coupling and decoupling the vacuum tank with the service port;

a vacuum pump adapted to be operably coupled to the vacuum tank and arranged to draw a vacuum on the vacuum tank;

a collapsible bladder adapted to be operatively coupled to the vacuum tank;

a supply of inert gas adapted to be operatively coupled to the bladder;

a first flow control valve adapted to be coupled between the supply of inert gas and the vacuum tank and arranged to selectively isolate the supply of inert gas from the vacuum tank;

a second flow control valve adapted to be coupled between the vacuum pump and the vacuum tank and arranged to selectively isolate the vacuum pump from the vacuum tank; and a third flow control valve adapted to be coupled between the service port and the vacuum tank and arranged to selectively isolate the vacuum tank from the service port.

20. The service kit of claim 18, wherein the first flow control valve is operatively disposed between the bladder and the vacuum tank.

21. The service kit of claim 19, further comprising:

a fifth flow control valve adapted to be operatively disposed between the bladder and the supply of inert gas and arranged to selectively isolate the bladder from the supply of inert gas.

22. A linear accelerator, comprising:

an x-ray tube;

a heat exchanger;

a circulation conduit for transferring coolant between the heat exchanger and the x-ray tube;

a branch coupling connected in-line between first and second portions of the circulation conduit;

a recouplable vacuum connector operatively connected to the branch coupling; and a flow control valve operatively disposed between the branch coupling and the recouplable vacuum connector and arranged to selectively isolate the branch coupling from the recouplable vacuum connector.

23. The linear accelerator of claim 22, wherein the branch coupling comprises a t-coupling having a first branch connected to the first portion of the circulation conduit, a second branch connected to the second portion of the circulation conduit, and a third branch connected to a connection conduit extending to the recouplable vacuum connector, and wherein the flow control valve comprises a shutoff valve disposed along the connection conduit.

\* \* \* \* \*